(12) United States Patent
Dong et al.

(10) Patent No.: US 9,351,165 B2
(45) Date of Patent: May 24, 2016

(54) IDENTITY VERIFYING METHOD, ACCOUNT ACQUIRING METHOD, AND MOBILE TERMINAL

(71) Applicant: TENCENT TECHNOLOGY (SHENZHEN) COMPANY LIMITED, Shenzhen, Guangdong (CN)

(72) Inventors: Liang Dong, Guangdong (CN); Meng Chen, Guangdong (CN); Rong Chen, Guangdong (CN); Yuanbin Chen, Guangdong (CN); Dechun Li, Guangdong (CN); Feifei Liu, Guangdong (CN); Zengxin Sun, Guangdong (CN); Yanping Tang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/714,553

(22) Filed: May 18, 2015

(65) Prior Publication Data
US 2015/0264574 A1 Sep. 17, 2015

Related U.S. Application Data

(63) Continuation of application No. PCT/CN2014/084661, filed on Aug. 18, 2014.

(30) Foreign Application Priority Data

Sep. 27, 2013 (CN) .......................... 2013 1 0461329

(51) Int. Cl.
*H04W 12/08* (2009.01)
*H04W 12/06* (2009.01)
(Continued)

(52) U.S. Cl.
CPC .............. *H04W 12/08* (2013.01); *G06F 21/32* (2013.01); *G06Q 20/32* (2013.01);
(Continued)

(58) Field of Classification Search
CPC .............. H04L 51/066; H04L 12/5835; H04L 12/5895; H04L 51/38; H04L 12/58; H04L 65/608; H04L 12/589; H04L 51/36; H04L 29/06027; H04L 51/063; H04L 51/32; H04L 65/103; H04L 65/104; H04L 65/4007
USPC ................ 455/413, 412.1, 414.4, 466, 404.1, 455/412.2, 414.1, 567, 418, 426.1, 406, 455/411, 414.2, 415, 422.1, 432.2, 432.3, 455/445, 465, 561; 370/352, 300, 493, 230, 370/235, 252
See application file for complete search history.

(56) References Cited

U.S. PATENT DOCUMENTS

2014/0099922 A1 * 4/2014 Cazanas ................. H04L 67/20
455/411

FOREIGN PATENT DOCUMENTS

| CN | 101179385 | 5/2008 |
|---|---|---|
| CN | 101464982 | 6/2009 |

(Continued)

OTHER PUBLICATIONS

International Search Report for PCT/CN2014/084661 mailed Nov. 19, 2014, two pages.

*Primary Examiner* — Inder Mehra
(74) *Attorney, Agent, or Firm* — Nixon & Vanderhye P.C.

(57) ABSTRACT

An identity verifying method, an account acquiring method, a mobile terminal, and a storage medium are disclosed, and the account acquiring method includes: receiving, by a first mobile terminal, a user operation of accepting identity verification on the first mobile terminal, playing voice information which is stored in the first mobile terminal and has a correspondence relationship with a user account of a user of the first mobile terminal, and meanwhile collecting voice data of the played voice information using voice receiving means; sending, by the first mobile terminal, verification information comprising the user account and the voice data to a server to allow the server to determine whether the user passes the identity verification according to the verification information; and receiving, by the first mobile terminal, an identity verification result returned by the server. Thus, the voice information is used for identity verification.

20 Claims, 6 Drawing Sheets

(51) Int. Cl.
*H04W 12/10* (2009.01)
*H04L 9/32* (2006.01)
*G10L 17/00* (2013.01)
*G06Q 20/32* (2012.01)
*G06Q 20/40* (2012.01)
*G06F 21/32* (2013.01)
*H04L 29/06* (2006.01)

(52) U.S. Cl.
CPC ......... *G06Q 20/40145* (2013.01); *G10L 17/00* (2013.01); *H04L 9/3231* (2013.01); *H04W 12/06* (2013.01); *H04W 12/10* (2013.01); *H04L 63/0861* (2013.01); *H04L 63/0876* (2013.01); *H04L 2463/082* (2013.01)

(56) References Cited

FOREIGN PATENT DOCUMENTS

| CN | 201409223 | 2/2010 |
|---|---|---|
| CN | 103219013 | 7/2013 |
| CN | 103220151 | 7/2013 |

\* cited by examiner

IDENTITY VERIFYING METHOD, ACCOUNT ACQUIRING METHOD, AND MOBILE TERMINAL

CROSS-REFERENCE TO RELATED APPLICATIONS

This application claims priority to and is a continuation application of PCT/CN2014/084661, filed on Aug. 18, 2014 and entitled "IDENTIFY VERIFYING METHOD, ACCOUNT ACQUIRING METHOD, MOBILE TERMINAL, AND STORAGE MEDIUM", which claims priority to Chinese Patent Application No. 201310461329.3, entitled "IDENTITY VERIFYING METHOD, ACCOUNT ACQUIRING METHOD AND MOBILE TERMINAL", filed on Sep. 27, 2013 by SHENZHEN TENCENT COMPUTER SYSTEM CO., LTD., the disclosures of which are incorporated herein by reference in their entirety.

FIELD OF THE DISCLOSURE

The present application relates to the field of network technologies, in particular, to an identity verifying method, an account acquiring method, and a mobile terminal.

BACKGROUND

As can be seen from the current development of the Internet, user operations have been increasingly transferred from Personal Computers (PCs) to mobile devices, so that identity verification (or identity authentication) becomes a new challenge in the mobile Internet, because intelligent mobile phones with touch screens are prevalent in the mobile Internet but it is difficult for a user to input a user account and a password via the touch screen in a user verification manner based on user accounts and passwords, thus degrading user experiences. In addition, anti-virus software for the mobile devices emerged very recently, so that trojan viruses have been prevalent in the mobile devices currently. Therefore, the conventional user verification manner based on the user account and password cannot sufficiently protect the property security and privacy of a mobile device user, resulting in low security.

SUMMARY

The present disclosure provides an identity verifying method, an account acquiring method, a mobile terminal and a storage medium, where voice information is used for identity verification of a user, thereby simplifying operations and improving security.

An aspect of the present disclosure provides an identity verifying method, which includes: receiving, by a first mobile terminal, a user operation of accepting identity verification on the first mobile terminal; playing, by the first mobile terminal, voice information which is stored in the first mobile terminal and has a correspondence relationship with a user account of a user of the first mobile terminal, and meanwhile collecting voice data of the played voice information using voice receiving means; sending, by the first mobile terminal, verification information including the user account and the voice data to a server for determining whether the user passes the identity verification according to the verification information; and receiving, by the first mobile terminal, an identity verification result returned by the server.

Another aspect of the present disclosure provides an identity verifying method, which includes: receiving, by a first mobile terminal, a user operation of accepting identity verification on the first mobile terminal; playing, by the first mobile terminal, voice information which is stored in the first mobile terminal and has a correspondence relationship with a user account of a user of the first mobile terminal; and collecting, by a second terminal, voice data of the played voice information using voice receiving means, and sending the user account and the collected voice data to a server as verification information for identity verification.

Another aspect of the present disclosure provides an account acquiring method, which includes: collecting, by a first mobile terminal, voice data of voice information played by a second mobile terminal, using voice receiving means in response to a user operation of confirming to collect voice data; sending, by the first mobile terminal, the collected voice data to a server to allow the server to determine an account having a correspondence relationship with the voice data and return the determined account to the first mobile terminal; and receiving, by the first mobile terminal, the account returned from the server.

Another aspect of the present disclosure provides a mobile terminal, which includes: a playing and receiving module, which is configured to receive a user operation of accepting identity verification, play voice information which is stored in the mobile terminal and has a correspondence relationship with a user account of a user of the mobile terminal, and meanwhile collect voice data of the played voice information using voice receiving means; a sending module, which is configured to send verification information to a server after the playing and receiving module obtains the voice data of the played voice information, to allow the server to determine whether the user passes the identity verification according to the verification information, where the verification information includes the user account and the voice data; and a receiving module, which is configured to receive an identity verification result returned by the server after the sending module sends the verification information.

In the solution, in response to the user operation of accepting identity verification, the first mobile terminal plays the voice information which is stored in the first mobile terminal, and meanwhile collects voice data of the played voice information through the voice receiving means; the first mobile terminal sends the verification information including the voice data to the server, to enable the server to determine whether the user passes the identity verification according to the verification information; and the first mobile terminal receives the identity verification result from the server. With the technical solution of the present embodiment, the identity verification is conducted through the voice information without the traditional way of inputting the account and password by the user for identity verification, so that the operations are simplified.

BRIEF DESCRIPTION OF THE DRAWINGS

The attached drawings, which form a part of the present disclosure, are intended to provide further explanation of the present disclosure. Exemplary embodiments of the present invention and illustration thereof are intended to explain the disclosure but not to improperly limit the disclosure. The drawings may be modified and substituted by those skilled in the art without any creative work, where.

DETAILED DESCRIPTION

It should be noted that embodiments of the present invention and features therein can be combined with each other if no conflict arises. The present disclosure will be illustrated in detail with reference to the drawings and in conjunction with the embodiments in order to make objects, solutions and advantages of the present disclosure more apparent. The described particular embodiments are provided merely for explaining the disclosure, but not limiting the disclosure.

Embodiments of the present invention provide an identity verifying method, an account acquiring method and a mobile terminal, for verifying a user identity using voice information, to simplify user operations and improve security.

Figure 1:
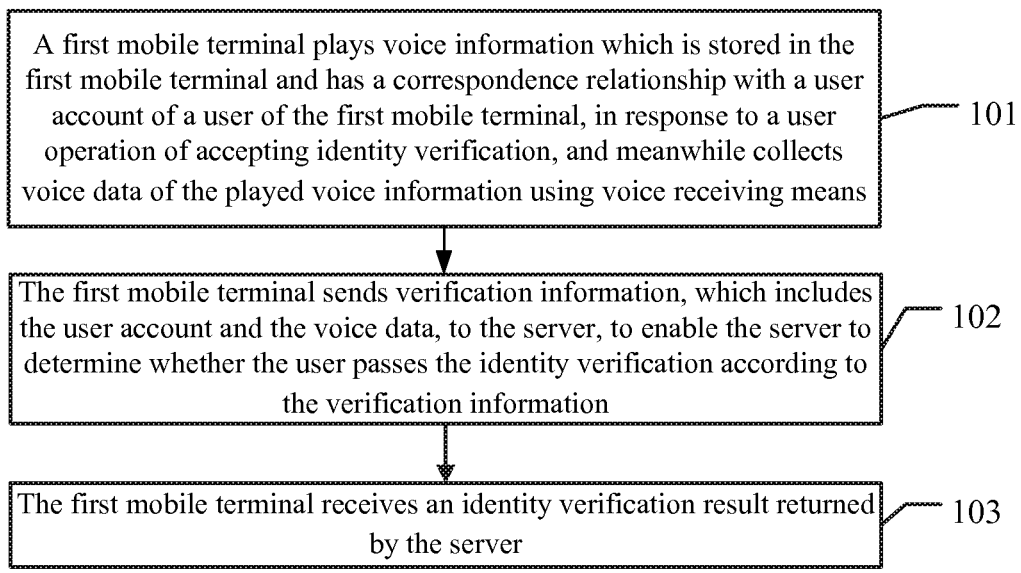
FIG. 1 is a schematic diagram showing an identity verifying method according to an embodiment of the present invention.

Referring to FIG. 1, which shows an implementation of an identity verifying method according to an embodiment of the present invention, and the identity verifying method, which may be performed by a mobile terminal, includes the following Steps 101, 102 and 103.

At Step 101, a first mobile terminal plays voice information which is stored in the first mobile terminal and has a correspondence relationship with a user account of a user of the first mobile terminal, in response to a user operation of accepting identity verification, and meanwhile collects voice data of the played voice information using voice receiving means.

In the present embodiment, when using a mobile terminal, a user is allowed to apply for the voice information for identity verification with respect to the mobile terminal. The voice information may be a voice two-dimensional (2D) barcode (i.e. a quick response code), which is improved compared with the traditional graphic 2D barcodes by converting a binary geometric pattern into a piece of voice data. That is, the phonetic 2D barcode is used to convert a 2D barcode corresponding to a user account into the voice data of a specified frequency.

The traditional graphic 2D barcodes are very demanding for environmental factors such as lights, but the phonetic 2D barcode is very resistant to environmental interferences and highly applicable due to a unique frequency band of the voice data contained in the phonetic 2D barcode, and therefore is superior to the traditional graphic 2D barcodes.

In the present embodiment, the description is made with an example where the identity of a user of a first mobile terminal is verified. The first mobile terminal plays voice information which is stored in the first mobile terminal and has a correspondence relationship with a user account, in response to a user operation of accepting identity verification, and meanwhile collects voice data of the played voice information using voice receiving means. When detecting the user operation of accepting the identity verification, the first mobile terminal activates both a playing function of voice playing means (e.g. a player) of the first mobile terminal and a voice collecting function of voice receiving means (e.g. a microphone), so that the first mobile terminal can collect the voice data of the voice information played by itself.

In the present embodiment, the mobile terminal may send a registration request including an account of the user to a server. After receiving the registration request, the server generates the voice information having a correspondence relationship with the user account, stores the correspondence relationship between the user account and the voice information, and returns the correspondence relationship and the generated voice information to the mobile terminal, to allow the mobile terminal to initiate identity verification using the correspondence relationship. Or, the mobile terminal may generate the voice information having a correspondence relationship with the user account, and return the generated voice information and the correspondence relationship between the user account and the voice information to the server, which stores the correspondence relationship.

At Step 102, the first mobile terminal sends verification information, which includes the user account and the voice data, to the server, to enable the server to determine whether the user passes the identity verification according to the verification information.

In the present embodiment, after collecting the voice data of the played voice information, the first mobile terminal sends the verification information including the user account and the voice data to the server, to enable the server to determine whether the user passes the identity verification according to the verification information.

At Step 103, the first mobile terminal receives an identity verification result returned by the server.

In the present embodiment, after receiving the verification information, the server processes the verification information to determine whether the user of the first mobile terminal passes the identity verification, and returns the identity verification result to the first mobile terminal, so that the first mobile terminal receives the returned identity verification result. In the case where the verification information includes the user account and the voice data, the server looks up a first correspondence relationship table to determine whether the correspondence relationship between the user account and the voice data that are sent from the first mobile terminal is present in the first correspondence relationship table, and if the correspondence relationship between the user account and the voice data is present in the first correspondence relationship table, it is determined that the user passes the identity verification, otherwise, it is determined that the user fails to pass the identity verification. Herein, the first correspondence relationship table includes correspondence relationships between user accounts and voice information.

The determining, by the server, whether the correspondence relationship between the user account and the voice data that are sent from the first mobile terminal is present in the first correspondence relationship table includes: the server looks up the first correspondence relationship table according to the user account in the verification information to determine voice information having a correspondence relationship with the user account in the verification information, parses the determined voice information to obtain voice data of the determined voice information, compares the voice data from the first mobile terminal and the voice data obtained from the parsing to determine whether similarity between the voice data from the first mobile terminal and the voice data obtained from the parsing is larger than a preset value, and if the similarity is larger than the preset value, it is determined that the correspondence relationship between the user account and the voice data that are sent from the first mobile terminal is present in the first correspondence relationship table; otherwise, it is determined that the correspondence relationship between the user account and the voice data that are sent from the first mobile terminal is not present in the first correspondence relationship table. Herein, the preset value may be set as 95%.

In the present embodiment, the verification information may further include a device identifier of the mobile terminal, and the voice information has a correspondence relationship with the device identifier of the mobile terminal and the user account. In addition, the identity verification may be requested by the mobile terminal per se, or by another mobile terminal.

Figure 2:
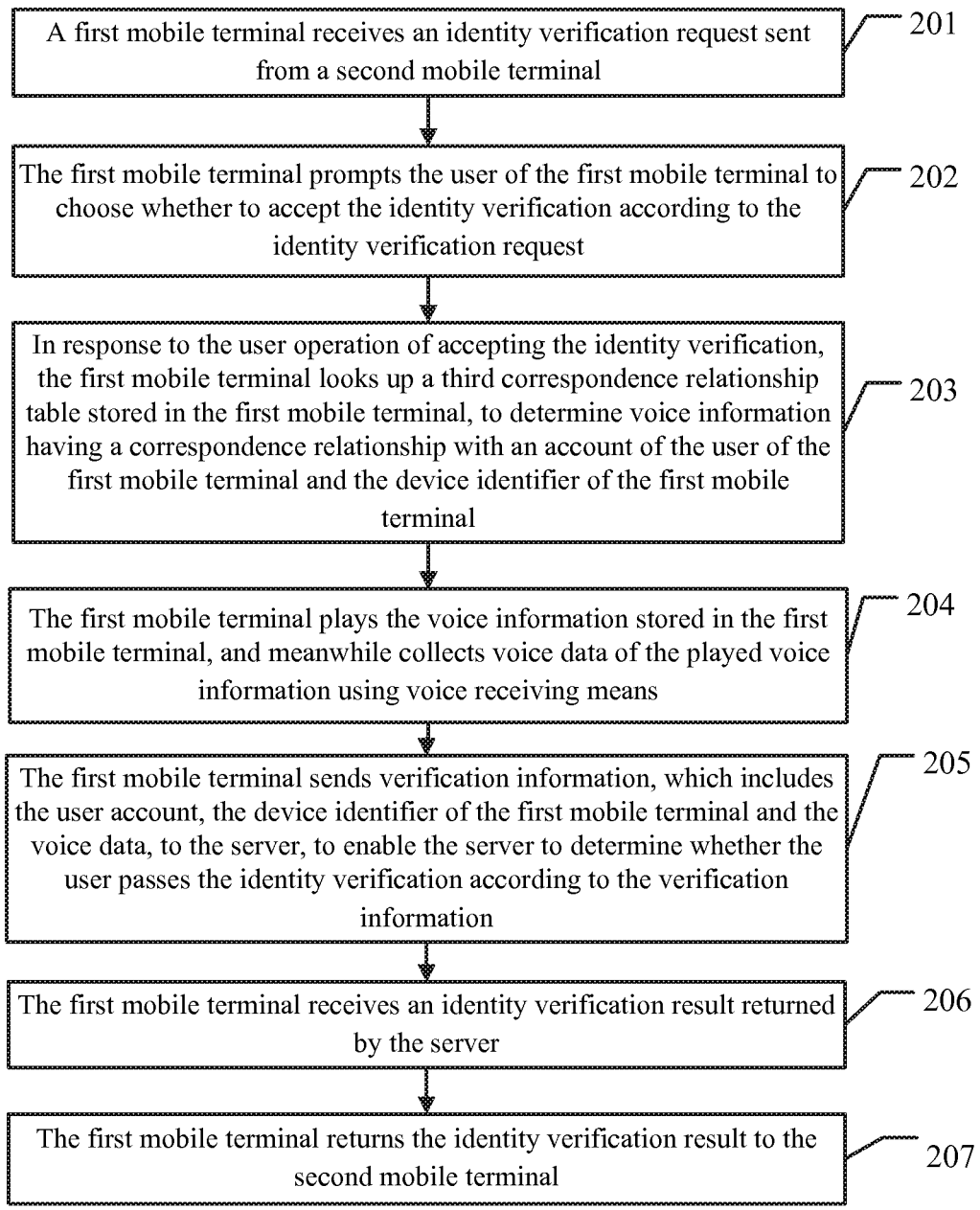
FIG. 2 is another schematic diagram showing an identity verifying method according to an embodiment of the present invention.

FIG. 2 shows an example of an identity verification method in which a second mobile terminal initiates the identity verification on a first mobile terminal in the case that the verification information further includes a mobile terminal device identifier. Likewise, the identity verification method may be performed at a mobile terminal. As shown in FIG. 2, the identity verification method includes the following Steps 201 to 207.

At Step 201, a first mobile terminal receives an identity verification request sent from a second mobile terminal.

In the present embodiment, a mobile terminal may send to a server a registration request including a user account and a device identifier of the mobile terminal After receiving the registration request, the server generates voice information having a correspondence relationship with the user account and the device identifier of the mobile terminal, stores the correspondence relationship among the device identifier of the mobile terminal, the user account and the voice information, and returns the correspondence relationship and the generated voice information to the mobile terminal, to allow the mobile terminal to initiate identity verification using the correspondence relationship. Or, the mobile terminal may generate the voice information having a correspondence relationship with the device identifier of the mobile terminal per se and the user account, and return the generated voice information and the correspondence relationship among the device identifier of the mobile terminal per se, the user account and the voice information to the server, so that the identity verification may be conducted on the mobile terminal by the server.

In the present embodiment, for data interaction between a user of the first mobile terminal and a user of the second mobile terminal, if the user of the second mobile terminal desires for identity verification on the user of the first mobile terminal, an identity verification request is sent from the second mobile terminal to the first mobile terminal, and the first mobile terminal initiates the identity verification function after receiving the identity verification request.

As can be seen, the second mobile terminal is additionally involved in the present embodiment. The terms like the first mobile terminal and the second mobile terminal are merely used for distinguishing two mobile terminals, but not intended to limit functions and types of the mobile terminals.

At Step 202, the first mobile terminal prompts the user of the first mobile terminal to choose whether to accept the identity verification according to the identity verification request.

In the present embodiment, after receiving the identity verification request, the first mobile terminal displays an interface according to the identity verification request, to allow the user of the first mobile terminal to choose whether to accept the identity verification, and the user may accept the identity verification by clicking an ACCEPT button, or reject the identity verification by clicking a REJECT button.

At Step 203, in response to the user operation of accepting the identity verification, the first mobile terminal looks up a third correspondence relationship table stored in the first mobile terminal, to determine voice information having a correspondence relationship with an account of the user of the first mobile terminal and the device identifier of the first mobile terminal Herein, the third correspondence relationship table includes the correspondence relationship among the user account, the device identifier of the first mobile terminal and the voice information.

In the present embodiment, if the user of the first mobile terminal selects to accept the identity verification by clocking the ACCEPT button, then in response to such user operation of accepting the identity verification, the first mobile terminal looks up the third correspondence relationship table stored in the first mobile terminal, to determine the voice information having a correspondence relationship with the user account and the device identifier of the first mobile terminal Herein, the third correspondence relationship table includes the correspondence relationship, which is stored at the side of the first mobile terminal, among the user account, the device identifier of the first mobile terminal and the voice information.

In the present embodiment, for the data interaction between the user of the first mobile terminal and the user of the second mobile terminal, at least one user account is present in each of the first mobile terminal and the second mobile terminal. If the user of the first mobile terminal and the user of the second mobile terminal chat with each other using the same instant messenger software, and the second mobile terminal initiates the identity verification on the first mobile terminal, then the user account refers to a user account used by the user of the first mobile terminal to log on the instant messenger software; and if the user of the first mobile terminal and the user of the second mobile terminal communicates with each other merely using a preliminary function (such as a short message function) of the mobile terminals, then when the second mobile terminal initiates the identity verification on the first mobile terminal, the user account refers to a Subscriber Identity Module (SIM) number of the first mobile terminal.

In an implementation of the present embodiment, before the first mobile terminal responds to the user operation of accepting the identity verification, the identity verifying method further includes that:

the first mobile terminal sends to the server a voice information acquiring request including the user account and the device identifier of the first mobile terminal;

the first mobile terminal receives voice information which is returned by the server according to the voice information acquiring request, where the voice information corresponds to the user account and the device identifier of the first mobile terminal; and the first mobile terminal stores a correspondence relationship among the user account, the device identifier of the first mobile terminal and the received voice information in the third correspondence relationship table.

To further ensure the security of the voice information, the voice information generated by the server is encrypted and then sent to the first mobile terminal After receiving the encrypted voice information, the first mobile terminal may decrypt and store the received voice information.

At Step 204, the first mobile terminal plays the voice information stored in the first mobile terminal, and meanwhile collects voice data of the played voice information using voice receiving means.

After searching out the voice information stored in the first mobile terminal, the first mobile terminal plays the voice information, and meanwhile collects voice data of the played voice information using voice receiving means.

At Step 205, the first mobile terminal sends verification information, which includes the user account, the device identifier of the first mobile terminal and the voice data, to the server, to enable the server to determine whether the user passes the identity verification according to the verification information.

In the present embodiment, the verification information includes the user account, the device identifier of the first mobile terminal and the voice data. After collecting the voice data of the played voice information, the first mobile terminal sends the verification information to the server, to enable the server to determine whether the user of the first mobile terminal passes the identity verification according to the verification information. Particularly, after the user account, the device identifier of the first mobile terminal and the voice data are sent from the first mobile terminal to the server, the server looks up a second correspondence relationship table stored in the server to determine whether the correspondence relationship among the user account, the device identifier of the first mobile terminal and the voice data is present in the second correspondence relationship table, and if the correspondence relationship is present in the second correspondence relationship table, it is determined that the user passes the identity verification, otherwise, it is determined that the user fails to pass the identity verification. Then, an identity verification result is returned by the server to the first mobile terminal.

In the present embodiment, the second correspondence relationship table contains a correspondence relationship among a user account, a mobile terminal device identifier and voice data. Thus, the determining, by the server, whether the correspondence relationship among the user account, the device identifier of the first mobile terminal and the voice data is present in the previously stored second correspondence relationship table particularly includes that:

the server looks up the second correspondence relationship table to search out voice information that corresponds to the device identifier of the first mobile terminal and the user account, parses the voice information searched out to obtain voice data of the voice information, and determines whether similarity between the voice data sent from the first mobile terminal and the voice data obtained from the parsing is larger than a preset value, and if the similarity is larger than the preset value, it is determined that the correspondence relationship among the user account, the device identifier of the first mobile terminal and the voice data that are sent from the first mobile terminal is present in the second correspondence relationship table; otherwise, it is determined that the correspondence relationship among the user account, the device identifier of the first mobile terminal and the voice data that are sent from the first mobile terminal is not present in the second correspondence relationship table. Herein, the preset value may be set as 95%.

At Step 206, the first mobile terminal receives an identity verification result returned by the server.

In the present embodiment, after conducting the identity verification on the user of the first mobile terminal according to the verification information, the server sends the identity verification result to the first mobile terminal. Thus, the identity verification result is received by the first mobile terminal.

At Step 207, the first mobile terminal returns the identity verification result to the second mobile terminal.

In the present embodiment, because the identity verification on the user of the first mobile terminal is initiated by the second mobile terminal, the identity verification result received by the first mobile terminal is returned by the first mobile terminal to the second mobile terminal.

In the present embodiment, the voice information may be a phonetic 2D barcode.

In the present embodiment, the identity verification information for identity verification includes a user account, a device identifier of the first mobile terminal and voice data, thus a security problem caused by a theft of the user account and the voice information is avoided, thereby improving the security.

In order for better understanding on the solution described in the embodiment shown in FIG. 2, a specific application scenario of the solution is described below.

In the scenario, a user A of a mobile phone A' is chatting with a user B of a mobile phone B' through instant messenger software such as Mobile QQ, and the user A requires for identity verification on the user B during the chatting, then the user A activates an identity verification request sending function of the mobile phone A', to send an identity verification request to the user B of the mobile phone B'. After receiving the identity verification request, the mobile phone B' displays an interface prompting the user B to confirm the identity verification. If the user B chooses to proceed with the identity verification, the mobile phone B' looks up a QQ account of the user B which is used by the user B to log on Mobile QQ, looks up a third correspondence relationship table stored in the mobile phone B' according to the QQ account of the user B and a device identifier of the mobile phone B' to obtain the corresponding voice information, then plays the obtained voice information, meanwhile collects voice data of the played voice information using a microphone, and sends the QQ account of the user B, the device identifier of the mobile phone B' and the voice data to the server, so that the server is able to determine whether the user B passes the identity verification. After receiving an identity verification result sent from the server, the mobile phone B' returns the identity verification result to the mobile phone A', so that the user A determines whether the user B passes through the identity verification.

Figure 3:
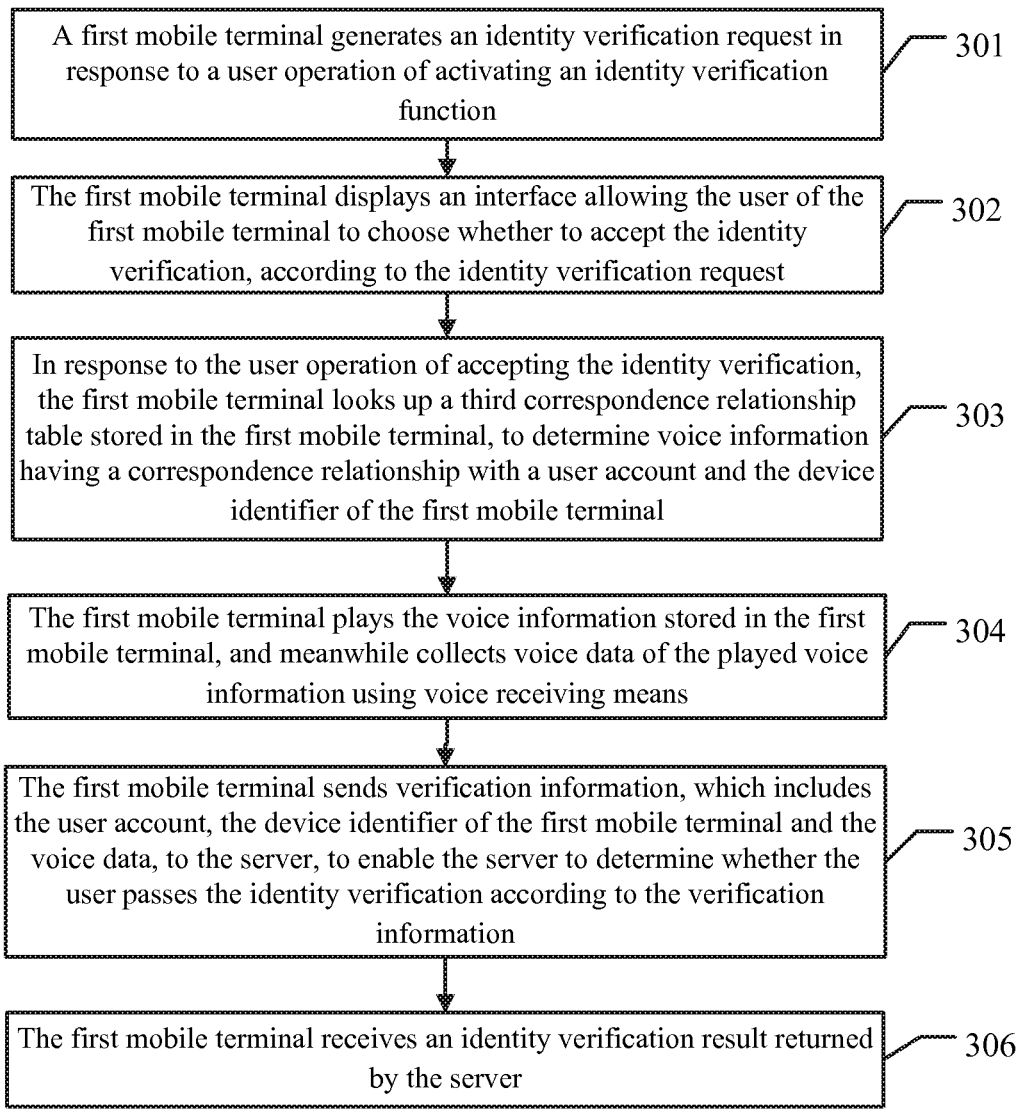
FIG. 3 is another schematic diagram showing an identity verifying method according to an embodiment of the present invention.

FIG. 3 shows an example of an identity verification method, which is performed by a mobile terminal for conducting identity verification on the mobile terminal per se in the case that the verification information includes a correspondence relationship among a user account, a device identifier of the mobile terminal and voice data. Likewise, the identity verification method may be performed at the mobile terminal. As shown in FIG. 3, the identity verification method includes the following Steps 301 to 306.

At Step 301, a first mobile terminal generates an identity verification request in response to a user operation of activating an identity verification function.

In the present embodiment, if the user using the first mobile terminal is requested to undergo identity verification conducted through the first mobile terminal, the user may activate an identity verification function of the first mobile terminal, and the first mobile terminal generates an identity verification request in response to the user operation of activating the identity verification function.

At Step 302, the first mobile terminal displays an interface allowing the user of the first mobile terminal to choose whether to accept the identity verification, according to the identity verification request.

In the present embodiment, after generating the identity verification request, the first mobile terminal displays the interface allowing the user of the first mobile terminal to choose whether to accept the identity verification, according to the identity verification request, and the user may accept the identity verification by clicking an ACCEPT button, or reject the identity verification by clicking a REJECT button.

At Step 303, in response to the user operation of accepting the identity verification, the first mobile terminal looks up a third correspondence relationship table stored in the first mobile terminal, to determine voice information having a correspondence relationship with a user account and the device identifier of the first mobile terminal Herein, the third correspondence relationship table includes the correspondence relationship among the user account, the device identifier of the first mobile terminal and the voice information.

At Step 304, the first mobile terminal plays the voice information stored in the first mobile terminal, and meanwhile collects voice data of the played voice information using voice receiving means.

At Step 305, the first mobile terminal sends verification information, which includes the user account, the device identifier of the first mobile terminal and the voice data, to the server, to enable the server to determine whether the user passes the identity verification according to the verification information.

Steps 304 and 305 are similar to Steps 204 and 205 in the embodiment shown in FIG. 2, respectively, and therefore are not described again herein.

At Step 306, the first mobile terminal receives an identity verification result returned by the server.

In the present embodiment, after conducting the identity verification on the user of the first mobile terminal, the server sends the identity verification result to the first mobile terminal Thus, the identity verification result is received by the first mobile terminal from the server.

In the present embodiment, the voice information may be a phonetic 2D barcode. In the solution of the present embodiment, the identity verification is conducted using the voice information without the traditional way of inputting the account and password by the user for identity verification, so that the operations are simplified and quick. Further, the identity verification information for identity verification includes a user account, a device identifier of the first mobile terminal and voice data, thus a security problem caused by the theft of the user account and the voice information is avoided, thereby improving the security.

For better understanding of the solution of the embodiment shown in FIG. 3, a specific application scenario is described below.

For example, when a user B is making a payment using his/her bank account through a mobile phone, the bank system requires for identity verification performed on the user B. In this case, the user B may activate the identity verification function of the mobile phone, so that the mobile phone generates an identity verification request in response to the activation operation of the user B. The mobile phone may display, according to the identity verification request, an interface allowing the user B to choose whether to accept the identity verification. If the user B accepts the identity verification by clicking an ACCEPT button, the mobile phone looks up a third correspondence relationship table stored in the mobile phone in response to the user operation of accepting the identity verification, to determine voice information having a correspondence relationship with the bank account of the user B and the device identifier of the mobile phone, meanwhile collects voice data of the played voice information (e.g. a phonetic 2D barcode) using a microphone, and then sends the bank account of the user B, the device identifier of the mobile phone and the voice data to the bank system. Then, the bank system determines whether the user B passes the identity verification, and sends an identity verification result to the mobile phone of the user B; and if the user B passes the identity verification, the payment is continued; otherwise, the payment is terminated to avoid a property loss of the user.

Currently, a user is required to undergo identity verification through a public terminal in various applications. For example, when a user makes a purchase in a shop and chooses to make the payment using a bank card, the user is typically required to input identity information and a password via a public terminal in the shop, so that the public terminal sends the identity information and the password to the corresponding bank system to proceed with the payment for goods. Thus, an embodiment of the present invention further provides an identity verifying method, which may be performed on a mobile terminal, and particularly includes that:

a first mobile terminal plays voice information which is stored in the first mobile terminal and has a correspondence relationship with a user account, in response to a user operation of accepting identity verification, and a second terminal meanwhile collects voice data of the played voice information using voice receiving means, and sends the user account and the collected voice data to the server as verification information.

Further, the identity verifying method includes that:

the first mobile terminal sends a device identifier of the first mobile terminal to the second terminal, to indicate the second terminal to collect the voice data of the played voice information using the voice receiving means and send the user account, the collected voice data and the device identifier of the first mobile terminal to the server as verification information, for the purpose of identity verification.

Further, before the first mobile terminal responds to the user operation of accepting the identity verification, the identity verifying method includes that:

the first mobile terminal sends to the server a voice information acquiring request which includes the user account and the device identifier of the first mobile terminal; and the first mobile terminal receives and stores voice information which is returned by the server according to the voice information acquiring request and corresponds to the user account and the device identifier of the first mobile terminal.

Further, the voice information may be a phonetic 2D barcode.

In the present embodiment, the first mobile terminal may be an intelligent mobile phone capable of playing the voice information, and the second terminal may be a mobile terminal other than the first mobile terminal, or a fixed terminal. The third correspondence relationship table including a correspondence relationship among a user account, a device identifier of a first mobile terminal and voice information may be stored on the first mobile terminal.

After receiving the voice information which is returned by the server according to the voice information acquiring request and corresponds to the user account and the device identifier of the first mobile terminal, the first mobile terminal may store the user account, the device identifier of the first mobile terminal and the voice information in the third correspondence relationship table. In response to the user operation accepting the identity verification, the first mobile terminal looks up the third correspondence relationship table for the device identifier of the first mobile terminal and the voice information both corresponding to the user account, plays the voice information found, and sends the found device identifier of the first mobile terminal to the second terminal.

The server stores a correspondence relationship table including a correspondence relationship between a user account and voice information, or a correspondence relationship table including a correspondence relationship among a user account, voice information, and a device identifier of a first mobile terminal. The server conducts the identity verification according to the verification information sent by the second terminal with reference to the stored correspondence relationship table. The process of the identity verification conducted by the server is similar to that shown in FIGS. 1 and 2, and therefore will not be described again herein.

In the present embodiment, at least a part of the verification information is inputted to the second terminal by means of the voice data of the voice information played by the first mobile terminal, which is different from the existing manner of manually inputting a password on the second terminal in the prior art. The solution of the present embodiment makes the inputting of the password simply and quick.

Especially, when the identity verification on the user is implemented based on both the user account and the device identifier of the first mobile terminal, the server verifies not only the correspondence relationship between the user account and the voice data as received, but also the correspondence relationship between the device identifier of the first mobile terminal and the voice data as received. If a third party acquires, by means of a malicious attacking device, the voice data of the voice information played by the first mobile terminal and sends the acquired voice data, the user account and a device identifier of a third party device to the server for identity verification through the second terminal, the server will determine that the identity verification is failed because the device identifier of the third party device is different from the device identifier of the first mobile terminal having a correspondence relationship with the user account and the voice data. Therefore, the solution of the present embodiment substantially improves the security of the identity verification.

For better understanding the solution of the present embodiment, a specific application scenario will be described below.

For example, when a user B is making a payment using a bank card through a PC at a shop and the bank system requires identity verification to be conducted on the user B, the user B may activate an identity verification function on his/her mobile phone, and the mobile phone generates an identity verification request in response to such activation operation of the user B. Then, the mobile phone displays an interface allowing the user B to choose whether to accept the identity verification, according to the identity verification request; and if the user B chooses to accept the identity verification by clicking an ACCEPT button, the mobile phone looks up a stored third correspondence relationship table in the mobile phone in response to the user operation of accepting the identity verification, to determine voice information having a correspondence relationship with the bank card number of the user B and the device identifier of the mobile phone, and plays the determined voice information. The PC at the shop collects voice data of the played voice information (e.g. a phonetic 2D barcode) using a microphone, and sends the bank card number of the user B, the device identifier of the mobile phone and the voice data to the bank system. Then, the bank system determines whether the user B passes the identity verification, and sends an identity verification result to the PC at the shop. If the user B passes the identity verification, the payment is continued; otherwise, the payment is terminated to avoid a property loss of the user B.

Figure 4:
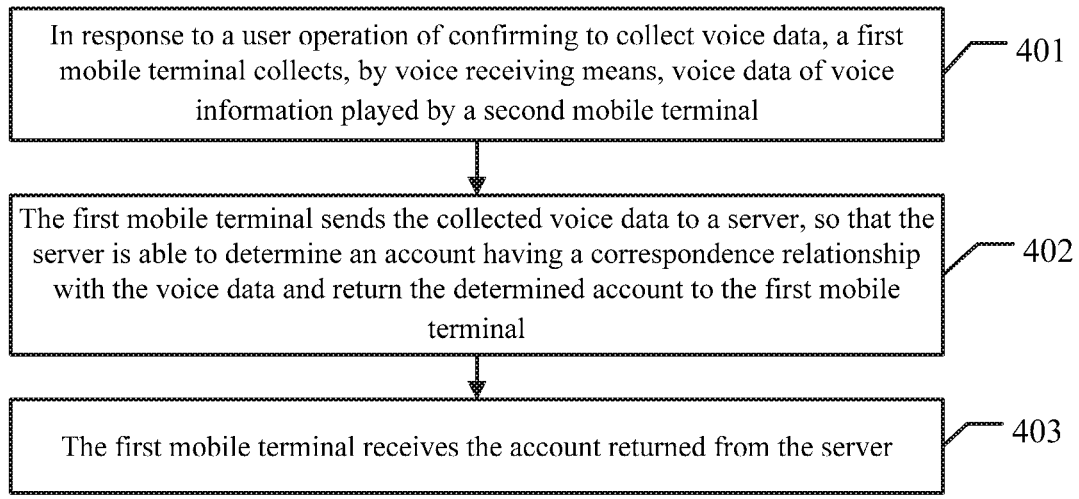
FIG. 4 is a schematic diagram showing an account acquiring method according to an embodiment of the present invention.

In an embodiment of the present invention, a user can acquire an account of another user through voice information and add the acquired account to a friend list. FIG. 4 shows an example of an account acquiring method according to an embodiment of the present invention, and the account acquiring method may be performed by a mobile terminal. As shown in FIG. 4, the account acquiring method includes the following Steps 401 to 403.

At Step 401, in response to a user operation of confirming to collect voice data, a first mobile terminal collects, by voice receiving means, voice data of voice information played by a second mobile terminal.

In the present embodiment, if a user of at least one first mobile terminal desires to obtain an account of a second mobile terminal, then the at least one first mobile terminal needs to activate its account acquiring function, the second mobile terminal needs to activate its voice information playing function, and a distance between the at least one first mobile terminal and the second mobile terminal is within a preset range, to ensure that voice receiving means of the at least one first mobile terminal can collect voice information played by the second mobile terminal.

In the present embodiment, after the user activates the account acquiring function of the first mobile terminal, the first mobile terminal displays an interface prompting the user whether to confirm to collect voice data; and if the user chooses to confirm to collect voice data, the first mobile terminal collects, using voice receiving means, voice data of the voice information played by the second mobile terminal Here, the voice information is played by the second mobile terminal after the voice receiving means of the first mobile terminal is activated.

At Step 402, the first mobile terminal sends the collected voice data to a server, so that the server is able to determine an account having a correspondence relationship with the voice data and return the determined account to the first mobile terminal.

In the present embodiment, the step that the first mobile terminal sends the collected voice data to a server so that the server is able to determine an account having a correspondence relationship with the voice data and return the determined account to the first mobile terminal particularly includes that: the first mobile terminal sends the collected voice data to the server, and the server looks up a stored fourth correspondence relationship table to determine the account having a correspondence relationship with the voice data. Herein, the fourth correspondence relationship table is configured to record a correspondence relationship between a user account and voice data.

At Step 403, the first mobile terminal receives the account returned from the server.

In the present embodiment, after sending the collected voice data to the server, the first mobile terminal receives the account having a correspondence relationship with the voice data from the server, so that the account of the second mobile terminal is acquired by the first mobile terminal.

In the present embodiment, the first mobile terminal collects the voice data of the voice information played by the second mobile terminal and sends the collected voice data to the server, and the server determines the account corresponding to the voice data, so that the account of the second mobile terminal can be effectively acquired by the first mobile terminal, and the user of the first mobile terminal is allowed to easily add the user of the second mobile terminal to a friend list.

For better understanding on the solution in the embodiment shown in FIG. 4, a specific application scenario is described below.

For example, a user A and a user B who chatting with each other using mobile phones wish to add an instant messenger account (such as a WeChat account) of one another to the own friend list, however, neither the user A nor the user B knows the instant messenger account of one another and knows how to find out the instant messenger account on the mobile phone. In this case, the user A may activate an account acquiring function of the mobile phone of the user A, the user B activates a voice information playing function of the mobile phone of the user B, and the user B starts the voice information playing function of the mobile phone of the user B to play voice having a correspondence relationship with the instant messenger account of the user B when voice receiving means of the mobile phone of the user A is operating, so that the voice receiving means of the mobile phone of the user A can collect voice data of the voice information played by the mobile phone of the user B. After collecting the voice data, the mobile phone of the user A sends the collected voice data to a server, and the server searches for an instant messenger account corresponding to the voice data, and sends the searched out instant messenger account to the user A, so that the user A obtains the instant messenger account of the user B and may add the instant messenger account of the user B to the friend list. Likewise, the user B can obtain the instant messenger account of the user A and add the instant messenger account of the user A to a friend list. Therefore, the adding of a friend to a friend list can be implemented efficiently.

Figure 5:
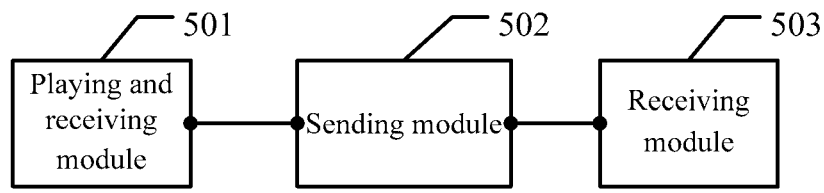
FIG. 5 is a schematic diagram showing a structure of a mobile terminal according to an embodiment of the present invention.

FIG. 5 shows a structure of a mobile terminal according to an embodiment of the present invention. As shown in FIG. 5, the mobile terminal includes:

a playing and receiving module 501, which is configured to play voice information which is stored in the mobile terminal and has a correspondence relationship with an account of a user of the mobile terminal, in response to a user operation of accepting identity verification, and meanwhile collect voice data of the played voice information using voice receiving means;

a sending module 502, which is configured to send verification information to the server after the playing and receiving module 501 obtains the voice data of the played voice information, to enable the server to determine whether the user passes the identity verification according to the verification information, where the verification information includes the user account and the voice data; and a receiving module 503, which is configured to receive an identity verification result returned by the server after the sending module 502 sends the verification information.

In the present embodiment, the playing and receiving module 501 of the mobile terminal plays the voice information which is stored in the mobile terminal and has a correspondence relationship with the user account in response to the user operation of accepting identity verification, and meanwhile collects voice data of the played voice information using the voice receiving means; then the sending module 502 sends the verification information including the user account and the voice data to the server, to enable the server to determine whether the user passes the identity verification according to the verification information; and the receiving module 503 receives the identity verification result returned by the server.

Figure 6:
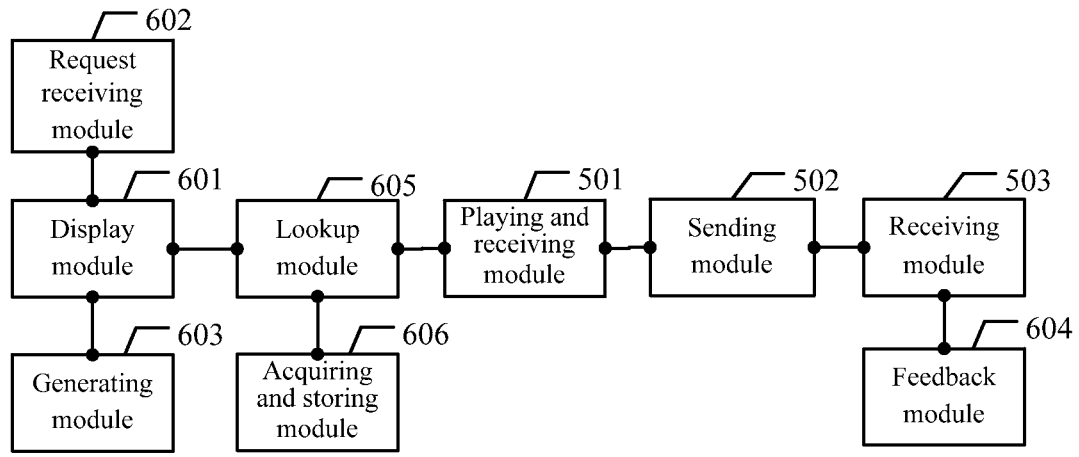
FIG. 6 is another schematic diagram showing a structure of a mobile terminal according to an embodiment of the present invention.

FIG. 6 shows a structure of a mobile terminal according to an embodiment of the invention, which is referred to as a first mobile terminal for the sake of description. As shown in FIG. 6, the first mobile terminal includes:

the playing and receiving module 501, the sending module 502 and the receiving module 503 which have been described in the embodiment shown in FIG. 5.

In the present embodiment, the sending module 502 is particularly configured to send the user account and the voice data to the server, so that the server may look up a first correspondence relationship table to determine whether a correspondence relationship between the user account and the voice data sent by the first mobile terminal is present in the first correspondence relationship table. If a correspondence relationship between the user account and the voice data sent by the first mobile terminal is present in the first correspondence relationship table, it is determined that the user passes the identity verification; otherwise, it is determined that the user fails to pass the identity verification. Herein, the first correspondence relationship table includes correspondence relationships between user accounts and voice information.

In the present embodiment, the verification information may further include a device identifier of the first mobile terminal.

The sending module 502 is particularly configured to send the user account, the device identifier of the first mobile terminal and the voice data to the server, so that the server looks up a second correspondence relationship table to determine whether a correspondence relationship among the user account, the device identifier of the first mobile terminal and the voice data is present in the second correspondence relationship table, and if the correspondence relationship is present in the second correspondence relationship table, it is determined that the user passes the identity verification, otherwise, it is determined that the user fails to pass the identity verification. Herein, the second correspondence relationship table includes correspondence relationships among user accounts, device identifiers of mobile terminals, and voice information.

In the present embodiment, the voice information may be a phonetic 2D barcode.

In the present embodiment, the mobile terminal further includes:

a display module 601, which is configured to display an interface allowing a user of the first mobile terminal to choose whether to accept the identity verification according to an identity verification request.

In the present embodiment, the mobile terminal further includes:

a request receiving module 602, which is configured to receive an identity verification request from a second mobile terminal, where the identity verification request is then displayed by the display module 601; or a generating module 603, which is configured to generate an identity verification request in response to the user operation of activating an identity verification function.

In the present embodiment, if the first mobile terminal receives an identity verification request from the second mobile terminal through the request receiving module 602, the first mobile terminal further includes:

a feedback module 604 which is configured to feed back the identity verification result received by the receiving module to the second mobile terminal.

In the present embodiment, the first mobile terminal may further includes:

a lookup module 605, which is configured to look up a third correspondence relationship table stored in the first mobile terminal to determine voice information having a correspondence relationship with a user account (i.e. an account of the user of the first mobile terminal) and the device identifier of the first mobile terminal Herein, the third correspondence relationship table includes the correspondence relationship among the user account, the device identifier of the first mobile terminal and the voice information.

In the present embodiment, the first mobile terminal further includes: an acquiring and storing module 606 which is configured to, before the lookup module 605 looks up the third correspondence relationship table stored in the first mobile terminal, send a voice information acquiring request, which includes the user account and the device identifier of the first mobile terminal, to the server;

receive voice information corresponding to both the user account and the device identifier of the first mobile terminal returned by the server according to the voice information acquiring request; and store the correspondence relationship among the user account, the device identifier of the first mobile terminal and the received voice information in the third correspondence relationship table.

In the present embodiment, the request receiving module 602 of the first mobile terminal receives an identity verification request from the second mobile terminal; or the generating module 603 generates an identity verification request in response to the user operation of activating an identity verification function; then the display module 601 displays an interface allowing the user of the first mobile terminal to choose whether to accept the identity verification according to the identity verification request; the lookup module 605 looks up the third correspondence relationship table stored in the first mobile terminal to determine the voice information having a correspondence relationship with the user account and the device identifier of the first mobile terminal, and the playing and receiving module 501 plays the voice information which is stored in the first mobile terminal and has a correspondence relationship with both the user account and the device identifier of the first mobile terminal, in response to the user operation of accepting identity verification, and meanwhile collects voice data of the played voice information using the voice receiving means; then the sending module 502 sends the verification information including the voice data, the user account and the device identifier of the first mobile terminal to the server, to enable the server to determine whether the user passes the identity verification according to the verification information; and finally the receiving module 503 receives the identity verification result returned by the server. If the identity verification request is received by the request receiving module 602 from the second mobile terminal, the identity verification result needs to be fed back by the feedback module 604 to the second mobile terminal.

Or, after the voice data is obtained by the playing and receiving module 501, the sending module 502 sends the user account and the voice data to the server, so that the server looks up the first correspondence relationship table to determine whether the correspondence relationship between the user account and the voice data that are sent from the first mobile terminal is present in the first correspondence relationship table; and if the correspondence relationship between the user account and the voice data is present in the first correspondence relationship table, it is determined that the user passes the identity verification; otherwise, it is determined that the user fails to pass the identity verification. Herein, the first correspondence relationship table includes correspondence relationships between user accounts and voice information. Finally, the identity verification result is received by the receiving module 503 from the server. Further, if the identity verification request is received by the request receiving module 602 from the second mobile terminal, the identity verification result needs to be fed back by the feedback module 604 to the second mobile terminal.

In the present embodiment, the identity verification information for identity verification includes a user account, a device identifier of the first mobile terminal and voice data, thus a security problem caused by the theft of the user account and the voice information is avoided, thereby improving the security.

Figure 7:
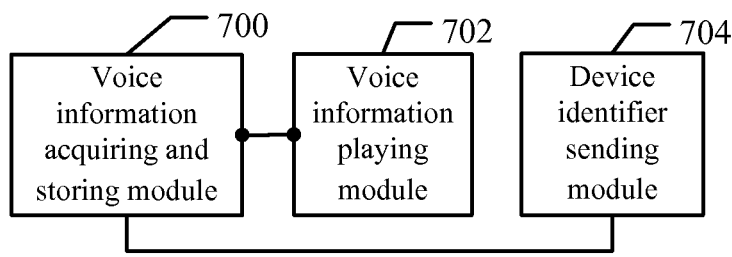
FIG. 7 is another schematic diagram showing a structure of a mobile terminal according to an embodiment of the present invention.

FIG. 7 shows the structure of a mobile terminal according to an embodiment of the present invention. As shown in FIG. 7, the mobile terminal includes: a voice information playing module 702, which is configured to play voice information which is stored in the mobile terminal and has a correspondence relationship with the user account in response to the user operation of accepting identity verification, so that a second terminal meanwhile collects voice data of the played voice information using voice receiving means and sends the user account and the collected voice data as verification information to the server for identity verification.

Further, the mobile terminal further includes a device identifier sending module 704, which is configured to: send a device identifier of the mobile terminal to the second terminal, so that the second terminal collects voice data of the played voice information using voice receiving means and sends the user account, the collected voice data and the device identifier of the mobile terminal as verification information to the server for identity verification.

Further, the mobile terminal includes a voice information acquiring and storing module 700, which is configured to, before the voice information playing module 702 responds to the user operation of accepting the identity verification, send to the server a voice information acquiring request including the user account and the device identifier of the mobile terminal; and receive and store voice information which is returned by the server according to the voice information acquiring request and corresponds to both the user account and the device identifier of the mobile terminal.

Here, the voice information may be a phonetic 2D barcode.

In the present embodiment, partial identity verification information is inputted to the second terminal by means of voice data of voice information played by the mobile terminal, instead of the way of manually inputting a password on the second terminal by the user in the prior art. Therefore, verification information such as a password may be easily and securely inputted by the solution of the present embodiment.

Figure 8:
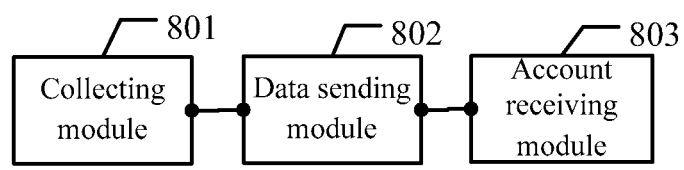
FIG. 8 is another schematic diagram showing a structure of a mobile terminal according to an embodiment of the present invention.

FIG. 8 shows a structure of a mobile terminal according to an embodiment of the invention, which is referred to as a first mobile terminal for the sake of description. As shown in FIG. 8, the first mobile terminal includes:

a collecting module 801, which is configured to collect, by using voice receiving means, voice data of voice information played by a second mobile terminal, in response to a user operation of confirming to collect voice data;

a data sending module 802, which is configured to send the voice data collected by the collecting module 801 to a server, so that the server determines an account having a correspondence relationship with the voice data and returns the determined account to the first mobile terminal; and an account receiving module 803, which is configured to receive the account returned by the server.

Here, the voice information may be a phonetic 2D barcode, and the data sending module 802 is particularly configured to send the voice data to the server, so that the server looks up a stored fourth correspondence relationship table to determine an account having a correspondence relationship with the voice data. Herein, the fourth correspondence relationship table includes a correspondence relationship between a user account and a phonetic 2D barcode.

The collecting module 801 collects, by using the voice receiving means, voice data of the phonetic 2D barcode played by the second mobile terminal, in response to a user operation of confirming to collect voice data; then the data sending module 802 sends the voice data to the server, so that the server looks up the stored fourth correspondence relationship table to determine an account having a correspondence relationship with the voice data; and then the account receiving module 803 receives the account returned by the server, after the data sending module 802 sends the voice data to the server.

In the present embodiment, the first mobile terminal collects voice data of the phonetic 2D barcode played by the second mobile terminal and sends the collected voice data to the server, so that the server determines an account corresponding to the voice data and returns the determined account to the first mobile terminal, thus, the first mobile terminal can effectively obtain the account of the second mobile terminal, and it is easy for the user to add another user to a friend list.

Figure 9:
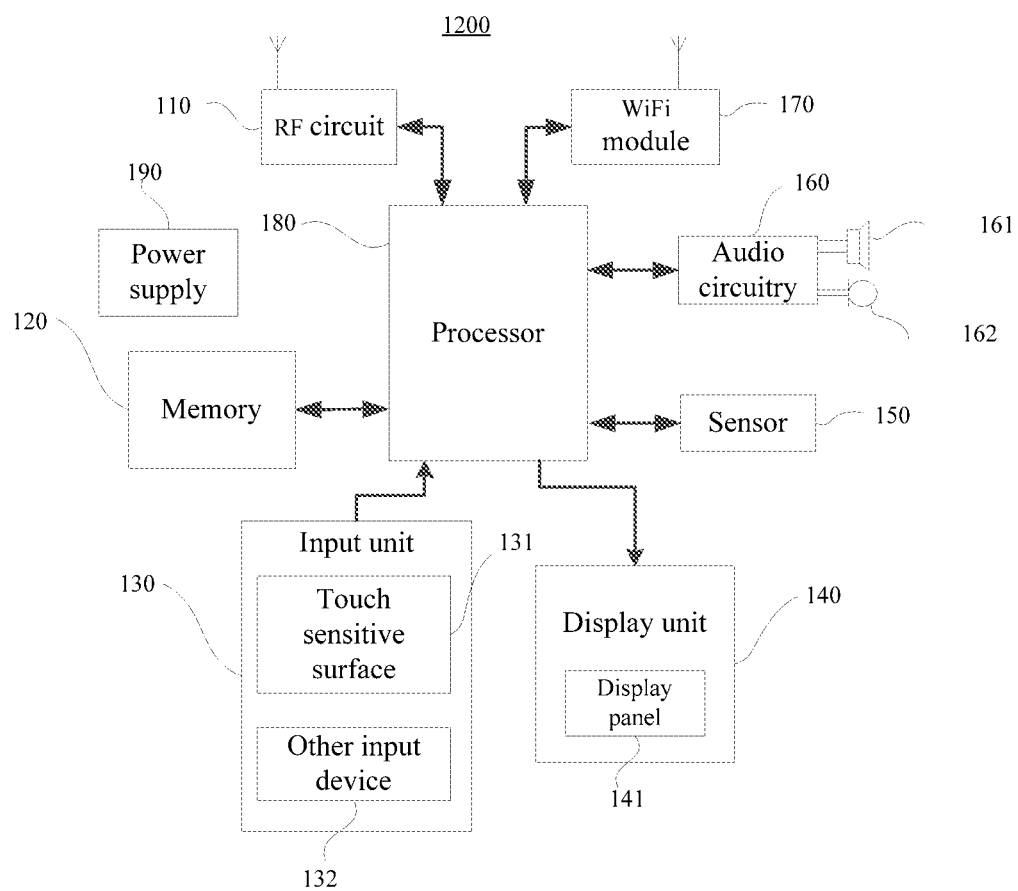
FIG. 9 is another schematic diagram showing a structure of a mobile terminal according to an embodiment of the present invention.

FIG. 9 shows an example of the structure of the mobile terminal in the present embodiment. As shown in FIG. 9, a mobile terminal 1200 includes: a Radio Frequency (RF) circuit 110, a memory 120 with one or more computer-readable storage media, an input unit 130, a display unit 140, a sensor 150, audio circuitry 160, a wireless fidelity (WiFi) module 170, a processor 180 with one or more processing cores, a power supply 190, and so on. Those skilled in the art will appreciate that, the structure of the mobile terminal shown in FIG. 9 does not constitute a limitation of the mobile terminal, and the mobile terminal may include more or less components than those as shown, or some components may be combined or different arranged.

The RF circuit 110 is configured to receive and transmit signals during information transceiving or conversation. Particularly, the RF circuit 110 receives downlink information from a base station and sends the downlink information to one or more processors 180 for processing, and also sends uplink data to the base station. Typically, the RF circuit 110 includes, but is not limited to, an antenna, at least one amplifier, a tuner, one or more oscillators, a subscriber identity module (SIM) card, a transceiver, a coupler, a Low Noise Amplifier (LNA), and/or a diplexer. In addition, the RF circuitry 110 may communicate with a network or other devices by wireless communication. The wireless communication may be implemented by any communications standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 is configured to store software programs and modules, which may be run by the processor 180 to perform various functions and data processing. The memory 120 may include a program storage area and a data storage area, where the program storage area can store an operating system and/or an application for at least one function (such as a sound playing function, an image showing function, etc.), and the data storage area can store data generated in the use of the mobile terminal 1200, such as audio data, a phone book, etc. In addition, the memory 120 may include a high-speed random access memory and a non-volatile memory, such as at least one disk storage device, a flash memory device, or other volatile solid-state memory devices. Accordingly, the memory 120 may also include a memory controller to allow the processor 180 and the input unit 130 to access the memory access 120.

The input unit 130 is configured to receive input digital or character information, and generate a keyboard, mouse, joystick, or trackball signal input related to user setting and function control. Specifically, the input unit 130 may include a touch sensitive surface 131 and other input device 132. The touch sensitive surface 131, also known as touch screen or touch panel, is configured to collect a touch operation on or near the touch sensitive surface 131 (such as an operation made by a user finger, touch pen or any suitable object on or near the touch sensitive surface 131), and drive the corresponding connected device according to a preset program. The touch sensitive surface 131 may include touch detection means and a touch controller, where the touch detection means is configured to detect a user touch position, detect a signal caused by the touch operation, and send the signal to the touch controller; and the touch controller is configured to receive touch information from the touch detection means, convert the received touch information into coordinates of a contact point, send the coordinates to the processor 180, and receive and execute a command sent from the processor 180. Further, the touch sensitive surface 131 may be implemented in a resistive, capacitive, infrared or surface acoustic wave form. In addition to the touch sensitive surface 131, the input unit 130 may also include other input device 132. Specifically, the other input device 132 may include, but is not limited to one or more of a physical keyboard, function keys (such as volume control keys, switch on or off keys, etc.), a trackball, a mouse, a joystick and so on.

The display unit 140 is configured to display information input by the user, information provided for the user, and various graphical user interfaces of the mobile terminal 1200 which may be formed by graphics, text, icon, video, and any combination thereof. The display unit 140 may include a display panel 141, which may be a Liquid Crystal Display (LCD) display panel, or an Organic Light-Emitting Diode (OLED) display panel. Further, the display panel 141 is overlapped by the touch sensitive surface 131, so that when a touch operation on or near the touch sensitive surface 131 is detected, a touch signal is transmitted to the processor 180 to determine the type of the touch event, and then the processor 180 controls the display panel 141 to display a corresponding visual output according to the type of the touch event. Although the touch sensitive surface 131 and the display panel 141 are shown as two separate components for input and output functions in FIG. 9, the touch sensitive surface 131 and the display panel 141 may be integrated to realize the input and output functions in some embodiments.

The mobile terminal 1200 may further include at least one sensor 150, such as an optical sensor, a motion sensor and other sensors. Specifically, the optical sensor may be an ambient light sensor or a proximity sensor, where the ambient light sensor is used for adjusting the brightness of the display panel 141 according to the brightness of ambient light, and the proximity sensor is used for turning off the display panel 141 and/or backlight when the mobile terminal 1200 approaches to the ear. As a motion sensor, a gravity sensor may detect the acceleration magnitude in each direction (typically including three axes of a coordinate system) in a moved state and the magnitude and direction of gravity in a rest state, and hence may be used in a mobile phone posture identifying application (such as switching between horizontal and vertical screens, related games, magnetometer calibration, etc.), a vibration identifying-related function (such as a pedometer, percussion), and the like. The mobile terminal 1200 may be further provided with a gyroscope, a barometer, a hygrometer, a thermometer, an infrared sensor, and the like, which will not be described herein.

The audio circuitry 160, a speaker 161, a microphone 162 function as audio interfaces between the user and the mobile terminal 1200. The audio circuitry 160 is configured to transmit an electrical signal derived from audio data to the speaker 161, where the electrical signal is converted into a sound signal for outputting; also, the microphone 162 converts a collected sound signal into an electric signal, which is received by the audio circuitry 160 and converted into audio data, and the audio data is transferred to the processor 180 for processing and then sent to, for example, another mobile terminal via the RF circuit 110, or the audio data is sent to the memory 120 for further processing. The audio circuitry 160 may also include earplug receiving hole for the connection between a headset and the mobile terminal 1200.

WiFi is a short-range wireless transmission technology, and the mobile terminal 1200 with the WiFi module 170 can be used for sending and receiving an email, browsing web pages and accessing streaming media, that is, WiFi provides users with broadband wireless access to the Internet. Although the WiFi module 170 is shown in FIG. 9, it may be understood that the WiFi module may be omitted in the mobile terminal 1200 as desired without changing the nature of the invention.

The processor 180, which functions as a control center of the mobile terminal 1200, is connected to various parts of the mobile terminal 1200 via various interfaces and lines, implements functions of the mobile terminal 1200 and processes data by executing a software program and/or module stored in the memory 120 and invoking data stored in the memory 120, thereby supervising overall the mobile terminal. The processor 180 may include one or more processing cores. Also, the processor 180 may be integrated with an application processor and a modem processor, where the application processor is preliminarily used for dealing with the operating system, user interfaces and applications, and the modem processor is preliminarily used for dealing with wireless communication. It may be appreciated that the modem processor may not be integrated with the processor 180.

The mobile terminal 1200 may further include a power supply 190 (such as a battery) which is configured to supply power to various parts of the mobile terminal. The power supply 190 may be connected with the processor 180 via a power management system, to implement functions of charge management, discharge management, and power consumption management via the power management system. The power supply 190 may also include one or more Alternating Current (AC) or Direct Current (DC) power supplies, a recharging system, a power failure detection circuit, a power converter or inverter, a power status indicator, etc.

Although not shown, the mobile terminal 1200 may also include a camera and/or a Bluetooth module, which will not be repeatedly described here. Specifically in the present embodiment, the mobile terminal 1200 is also referred to as first mobile terminal. The display unit of the mobile terminal 1200 may be a touch screen display, and the mobile terminal further includes a memory and one or more programs stored in the memory, where the one or more programs are executed by one or more processors to perform the following instructions that:

in response to the user operation of accepting identity verification, the first mobile terminal plays the voice information which is stored in the first mobile terminal and having a correspondence relationship with the user account, and meanwhile collects voice data of the played voice information through the voice receiving means; the first mobile terminal sends the verification information including the user account and the voice data to the server, to enable the server to determine whether the user passes the identity verification according to the verification information; and the first mobile terminal receives the identity verification result from the server. Such implementation is referred to as first implementation for the sake of description.

In a second implementation based on the above first implementation, the verification information may further include a device identifier of the first mobile terminal, and the memory of the mobile terminal 1200 further contains instructions for performing the following operations that:

the first mobile terminal sends the user account, the device identifier of the first mobile terminal and the voice data to the server, so that the server looks up a second correspondence relationship table to determine whether a correspondence relationship among the user account, the device identifier of the first mobile terminal and the voice data that are sent from the first mobile terminal is present in the second correspondence relationship table; and if the correspondence relationship is present in the second correspondence relationship table, it is determined that the user passes the identity verification, otherwise, it is determined that the user fails to pass the identity verification. Herein, the second correspondence relationship table includes correspondence relationships among user accounts, device identifiers of mobile terminals, and voice information.

In a third implementation based on the above second implementation, the memory of the mobile terminal 1200 further contains instructions for performing the following operations that:

the first mobile terminal looks up a third correspondence relationship table stored in the first mobile terminal, to determine voice information having a correspondence relationship with both the user account and the device identifier of the first mobile terminal Herein, the third correspondence relationship table includes the correspondence relationship among the user account, the device identifier of the first mobile terminal and the voice information.

In a fourth implementation based on the above third implementation, the memory of the mobile terminal 1200 further contains instructions for performing the following operations that:

the first mobile terminal sends to the server a voice information acquiring request including the user account and the device identifier of the first mobile terminal;

the first mobile terminal receives voice information which is returned by the server according to the voice information acquiring request, where the voice information corresponds to the user account and the device identifier of the first mobile terminal; and the first mobile terminal stores a correspondence relationship among the user account, the device identifier of the first mobile terminal and the received voice information in the third correspondence relationship table.

In a fourth implementation based on the above first implementation, the memory of the mobile terminal 1200 further contains instructions for performing the following operations that:

the first mobile terminal displays an interface allowing the user of the first mobile terminal to choose whether to accept the identity verification, according to the identity verification request.

In a fifth implementation based on the above fourth implementation, the memory of the mobile terminal 1200 further contains instructions for performing the following operations that:

an identity verification request is received by the first mobile terminal from the second mobile terminal; or the first mobile terminal generates an identity verification request in response to the user operation of activating the identity verification function.

In a sixth implementation based on the above fifth implementation, the memory of the mobile terminal 1200 further contains instructions for performing the following operations that: the first mobile terminal returns the identity verification result to the second mobile terminal.

In addition, the memory of the mobile terminal 1200 further contains instructions for performing the following operations that: in response to a user operation of confirming to collect voice data, the first mobile terminal collects, by voice receiving means, voice data of voice information played by a second mobile terminal, sends the collected voice data to a server so that the server can determine an account having a correspondence relationship with the voice data and return the determined account to the first mobile terminal, and receives the account returned by the server.

In the present embodiment, the voice information may be a phonetic 2D barcode, and the step that the first mobile terminal sends the collected voice data to a server so that the server can determine an account having a correspondence relationship with the voice data and return the determined account to the first mobile terminal particularly includes that: the first mobile terminal sends the collected voice data to the server, and the server looks up a stored fourth correspondence relationship table to determine the account having a correspondence relationship with the voice data. Herein, the fourth correspondence relationship table includes a correspondence relationship between a user account and voice data of a phonetic 2D barcode.

Another embodiment provides a computer-readable storage medium, which may be the computer-readable storage medium contained in the memory in the above embodiments, or may be a computer-readable storage medium separate from the terminal. The computer-readable storage medium of the present embodiment contains at least one program which may be executed by at least one processor to perform an identity verifying method, and the identity verifying method includes that: in response to a user operation of accepting identity verification, the first mobile terminal plays the voice information which is stored in the first mobile terminal and has a correspondence relationship with the user account, and meanwhile collects voice data of the played voice information through voice receiving means; the first mobile terminal sends the verification information including the user account and the voice data to the server, so that the server can determine whether the user passes the identity verification according to the verification information; and the first mobile terminal receives an identity verification result from the server. This embodiment is referred to as first implementation hereinafter for the sake of description.

In a second implementation based on the above first implementation, the step that the first mobile terminal sends the verification information including the user account and the voice data to the server so that the server can determine whether the user passes the identity verification according to the verification information includes that:

the first mobile terminal sends the user account and the voice data to the server, so that the server looks up a first correspondence relationship table to determine whether the correspondence relationship between the user account and the voice data that are sent from the first mobile terminal is present in the first correspondence relationship table, and if the correspondence relationship between the user account and the voice data is present in the first correspondence relationship table, it is determined that the user passes the identity verification, otherwise, it is determined that the user fails to pass the identity verification. Herein, the first correspondence relationship table includes correspondence relationships between user accounts and voice information.

In a third implementation based on the above first implementation, the verification information further includes a device identifier of the first mobile terminal, and the step that the first mobile terminal sends the verification information including the user account and the voice data to the server so that the server can determine whether the user passes the identity verification according to the verification information includes that:

the first mobile terminal sends the user account, the device identifier of the first mobile terminal and the voice data to the server, so that the server looks up a second correspondence relationship table stored in the server to determine whether the correspondence relationship among the user account, the device identifier of the first mobile terminal and the voice data is present in the second correspondence relationship table, and if the correspondence relationship is present in the second correspondence relationship table, it is determined that the user passes the identity verification, otherwise, it is determined that the user fails to pass the identity verification. Herein, the second correspondence relationship table includes correspondence relationships among user accounts, device identifiers of mobile terminals, and voice information.

In a fourth implementation based on the above third implementation, before the first mobile terminal plays the voice information which is stored in the first mobile terminal and has a correspondence relationship with the user account, the identity verifying method further includes:

looking up a third correspondence relationship table stored in the first mobile terminal, to determine voice information having a correspondence relationship with the user account and the device identifier of the first mobile terminal Herein, the third correspondence relationship table includes the correspondence relationship among the user account, the device identifier of the first mobile terminal and the voice information.

In a fifth implementation based on the above first implementation, before responding to the user operation of accepting the identity verification, the identity verifying method further includes: displaying an interface allowing the user of the first mobile terminal to choose whether to accept the identity verification, according to the identity verification request.

In a sixth implementation based on the above fifth implementation, before displaying an interface allowing the user of the first mobile terminal to choose whether to accept the identity verification according to the identity verification request, the identity verifying method further includes: receiving the identity verification request sent from the second mobile terminal; or generating the identity verification request in response to the user operation of activating the identity verification function.

In a seventh implementation based on the above sixth implementation, if the identity verification request is received from the second mobile terminal, the identity verifying method further includes: after an identity verification result is returned by the server, sending the identity verification result to the second mobile terminal.

Still another embodiment provides a graphical user interface which is applicable to a terminal including a touch screen display, a memory and at least one processor for executing at least one program, and the graphical user interface is in such a manner that: in response to a user operation of accepting identity verification, the first mobile terminal plays voice information which is stored in the first mobile terminal and has a correspondence relationship with the user account, and meanwhile collects voice data of the played voice information through voice receiving means; the first mobile terminal sends verification information including the user account and the voice data to the server, so that the server can determine whether the user passes the identity verification according to the verification information; and the first mobile terminal receives an identity verification result from the server.

It would be appreciated by those skilled in the art that all of or a part of steps of the methods in the above embodiments can be performed by hardware under the control of software, and the software may be stored on a computer-readable storage medium which may be a read only memory, a disk or a compact disk.

The identity verifying method, the account acquiring method, the mobile terminal and the storage medium of the present disclosure have been described in detail as above. However, modifications to the present invention may readily occur to those skilled in the art in light of the principle of the embodiments of the present invention without departing from the scope of the invention. Further, the disclosure provided herein shall not be construed as a limitation on the present invention.

The sequence numbers of the above embodiments of the disclosure are only for the purpose of description, and do not represent one embodiment is superior to another.

The invention claimed is:

1. An identity verifying method, comprising:
   receiving, by a first mobile terminal, a user operation of accepting identity verification on the first mobile terminal,
   playing, by the first mobile terminal, voice information which is stored in the first mobile terminal and has a correspondence relationship with a user account of a user of the first mobile terminal,
   collecting voice data of the played voice information using voice receiving means,
   sending, by the first mobile terminal, verification information comprising the user account and the voice data to a server for determining whether the user passes the identity verification according to the verification information, and
   receiving, by the first mobile terminal, an identity verification result returned by the server.

2. The method of claim 1, wherein the first mobile terminal sending verification information comprising the user account and the voice data to a server for determining whether the user passes the identity verification according to the verification information comprises that:
   the first mobile terminal sends the user account and the voice data to the server to allow the server to look up a first correspondence relationship table to determine whether a correspondence relationship between the user account and the voice data that are sent from the first mobile terminal is present in the first correspondence relationship table, and if the correspondence relationship between the user account and the voice data is present in the first correspondence relationship table, it is determined that the user passes the identity verification, otherwise, it is determined that the user fails to pass the identity verification, wherein the first correspondence relationship table is configured to record a correspondence relationship between a user account and voice information.

3. The method of claim 1, wherein the verification information further comprises a device identifier of the first mobile terminal,
   the first mobile terminal sending verification information comprising the user account and the voice data to a server for determining whether the user passes the identity verification according to the verification information comprises that:
   the first mobile terminal sends the user account, the device identifier of the first mobile terminal, and the voice data to the server to allow the server to look up a second correspondence relationship table to determine whether a correspondence relationship among the user account, the device identifier of the first mobile terminal, and the voice data that are sent from the first mobile terminal is present in the second correspondence relationship table, and if the correspondence relationship is present in the second correspondence relationship table, it is determined that the user passes the identity verification, otherwise, it is determined that the user fails to pass the identity verification, wherein the second correspondence relationship table is configured to record a correspondence relationship among a user account, a device identifier of the first mobile terminal and voice information.

4. The method of claim 3, wherein before the first mobile terminal plays the voice information which is stored in the first mobile terminal and has a correspondence relationship with the user account of the user, the method further comprises that:
   the first mobile terminal looks up a third correspondence relationship table stored in the first mobile terminal to determine voice information having a correspondence relationship with both the user account of the user of the first mobile terminal and the device identifier of the first mobile terminal, wherein the third correspondence relationship table is configured to record a correspondence relationship among a user account, a device identifier of the first mobile terminal and voice information.

5. The method of claim 4, wherein before the first mobile terminal looks up the third correspondence relationship table stored in the first mobile terminal, the method comprises:
   sending to the server, by the first mobile terminal, a voice information acquiring request comprising the user account and the device identifier of the first mobile terminal;
   receiving, by the first mobile terminal, voice information that is returned by the server according to the voice information acquiring request, wherein the voice information corresponds to both the user account and the device identifier of the first mobile terminal; and
   storing, by the first mobile terminal, a correspondence relationship among the user account, the device identifier of the first mobile terminal and the received voice information into the third correspondence relationship table.

6. The method of claim 1, wherein the voice information is a phonetic 2D barcode.

7. The method of claim 1, wherein before the first mobile terminal responds to the user operation of accepting identity verification, the method further comprises:

displaying, by the first mobile terminal, an interface allowing the user to choose whether to accept the identity verification, according to an identity verification request.

8. The method of claim 7, wherein before the first mobile terminal displaying the interface allowing the user to choose whether to accept the identity verification according to the identity verification request, the method further comprises:

receiving, by the first mobile terminal, the identity verification request from a second mobile terminal; or generating, by the first mobile terminal, the identity verification request in response to a user operation of activating an identity verification function of the first mobile terminal.

9. The method of claim 8, wherein if the identity verification request is received by the first mobile terminal from the second mobile terminal, after the first mobile terminal receives the identity verification result returned by the server, the method further comprises:

returning, by the first mobile terminal, the identity verification result to the second mobile terminal.

10. An identity verifying method, comprising:

receiving, by a first mobile terminal, a user operation of accepting identity verification on the first mobile terminal;

playing, by the first mobile terminal, voice information which is stored in the first mobile terminal and has a correspondence relationship with a user account of a user of the first mobile terminal; and collecting, by a second terminal, voice data of the played voice information using voice receiving means, and sending the user account and the collected voice data to a server as verification information for identity verification.

11. The method of claim 10, further comprising:

sending, by the first mobile terminal, a device identifier of the first mobile terminal to the second terminal, to indicate the second terminal to collect the voice data of the played voice information using the voice receiving means and send the user account, the collected voice data and the device identifier of the first mobile terminal to the server as the verification information for identity verification.

12. The method of claim 11, wherein before the first mobile terminal responds to the user operation of accepting identity verification, the method further comprises:

sending to the server, by the first mobile terminal, a voice information acquiring request comprising the user account and the device identifier of the first mobile terminal; and receiving and storing, by the first mobile terminal, voice information that is returned by the server according to the voice information acquiring request, wherein the voice information corresponds to both the user account and the device identifier of the first mobile terminal.

13. An account acquiring method, comprising:

collecting, by a first mobile terminal, voice data of voice information played by a second mobile terminal, using voice receiving means in response to a user operation of confirming to collect voice data;

sending, by the first mobile terminal, the collected voice data to a server to allow the server to determine an account having a correspondence relationship with the voice data and return the determined account to the first mobile terminal; and receiving, by the first mobile terminal, the account returned from the server.

14. The method of claim 13, wherein the voice information is a phonetic 2D barcode, and the first mobile terminal sending the collected voice data to a server to allow the server to determine an account having a correspondence relationship with the voice data and return the determined account to the first mobile terminal comprises:

sending, by the first mobile terminal, the collected voice data to the server, to allow the server to look up a stored fourth correspondence relationship table to determine the account having a correspondence relationship with the voice data, wherein the fourth correspondence relationship table is configured to record a correspondence relationship between a user account and a phonetic 2D barcode.

15. A mobile terminal, comprising:

a playing and receiving module, which is configured to receive a user operation of accepting identity verification, play voice information which is stored in the mobile terminal and has a correspondence relationship with a user account of a user of the mobile terminal, and meanwhile collect voice data of the played voice information using voice receiving means;

a sending module, which is configured to send verification information to a server after the playing and receiving module obtains the voice data of the played voice information, to allow the server to determine whether the user passes the identity verification according to the verification information, wherein the verification information comprises the user account and the voice data; and a receiving module, which is configured to receive an identity verification result returned by the server after the sending module sends the verification information.

16. The mobile terminal of claim 15, wherein the sending module is configured to send the user account and the voice data to the server, to allow the server to look up a first correspondence relationship table to determine whether a correspondence relationship between the user account and the voice data sent by the mobile terminal is present in the first correspondence relationship table; and if the correspondence relationship between the user account and the voice data is present in the first correspondence relationship table, it is determined that the user passes the identity verification; otherwise, it is determined that the user fails to pass the identity verification, wherein the first correspondence relationship table is configured to record a correspondence relationship between a user account and voice information.

17. The mobile terminal of claim 15, wherein the verification information further comprises a device identifier of the mobile terminal, the sending module is configured to send the user account, the device identifier of the mobile terminal and the voice data to the server, to allow the server to look up a second correspondence relationship table to determine whether a correspondence relationship among the user account, the device identifier of the mobile terminal and the voice data is present in the second correspondence relationship table, and if the correspondence relationship is present in the second correspondence relationship table, it is determined that the user passes the identity verification, otherwise, it is determined that the user fails to pass the identity verification, wherein the second correspondence relationship table is configured to record a correspondence relationship among a user account, a device identifier of a mobile terminal, and voice information.

18. The mobile terminal of claim 17, further comprising:
a lookup module, which is configured to look up a third correspondence relationship table stored in the mobile terminal to determine voice information having a correspondence relationship with the user account and the device identifier of the mobile terminal, wherein the third correspondence relationship table is configured to record a correspondence relationship among a user account, a device identifier of a mobile terminal and voice information.

19. The mobile terminal of claim 18, further comprising:
an acquiring and storing module which is configured to,
    before the lookup module looks up the third correspondence relationship table stored in the mobile terminal,
send to the server a voice information acquiring request, which comprises the user account and the device identifier of the mobile terminal;
receive voice information corresponding to both the user account and the device identifier of the mobile terminal returned by the server according to the voice information acquiring request; and
store a correspondence relationship among the user account, the device identifier of the mobile terminal and the received voice information in the third correspondence relationship table.

20. The mobile terminal of claim 15, further comprising:
a display module, which is configured to display an interface allowing the user to choose whether to accept the identity verification, according to an identity verification request.

* * * * *